Figure 1:
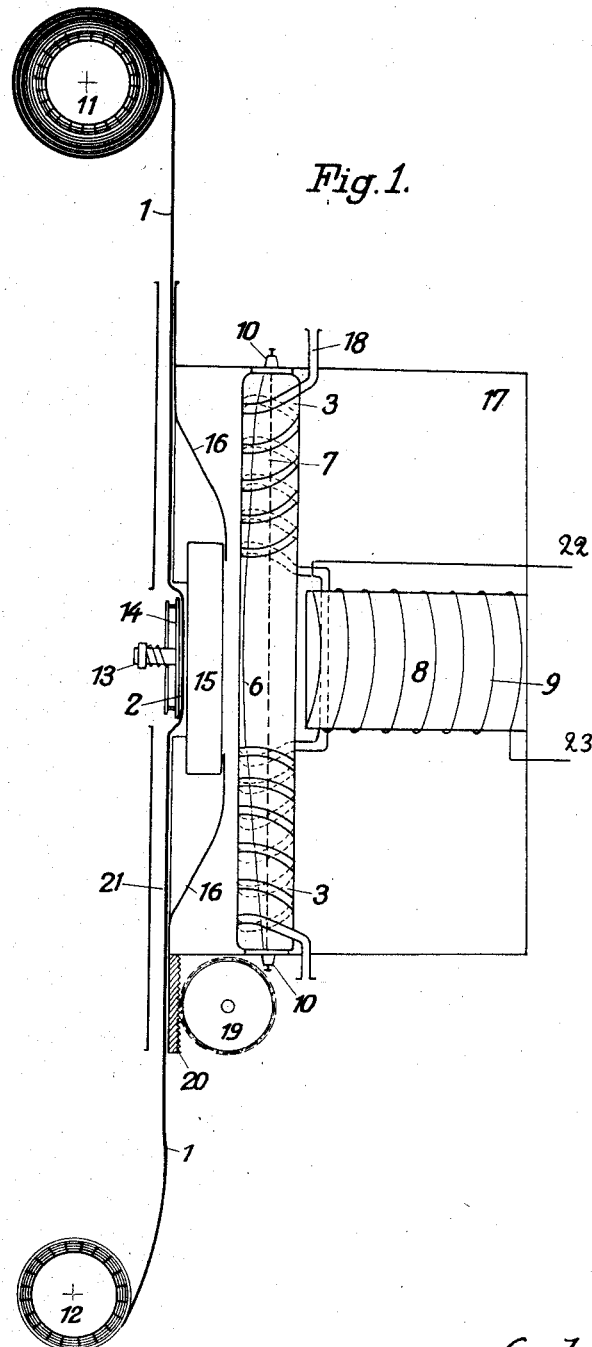

July 12, 1932. C. ROEHRICH 1,867,100
LIGHT SOURCE FOR PHOTOGRAPHIC COPYING PURPOSES
Filed March 16, 1929 2 Sheets-Sheet 1

Inventor:
Carl Roehrich
By Robb & Robb
Attorneys

July 12, 1932. C. ROEHRICH 1,867,100
LIGHT SOURCE FOR PHOTOGRAPHIC COPYING PURPOSES
Filed March 16, 1929 2 Sheets-Sheet 2

Inventor:
Carl Roehrich
By
Attorneys

Patented July 12, 1932

1,867,100

UNITED STATES PATENT OFFICE

CARL ROEHRICH, OF BERLIN, GERMANY, ASSIGNOR TO THE FIRM SILFREE AKTIENGE-SELLSCHAFT, (SILFREE LIMITED), OF VADUZ, LIECHTENSTEIN

LIGHT SOURCE FOR PHOTOGRAPHIC COPYING PURPOSES

Application filed March 16, 1929, Serial No. 347,604, and in Germany March 22, 1928.

The invention relates, broadly speaking, to a method for manufacturing photographic pictures, and is more particularly concerned with novel means for copying purposes in the production of moving picture films.

Practice and numerous experiments have established the use of certain light sources for copying purposes. The most common light source is the one in which discharges are effected through an atmosphere of mercury vapors. Such light sources produce chemically active rays which are particularly suitable for transmitting photographic pictures from a given negative unto a sensitized film or plate. The efficiency of such light sources is, however, under ordinary conditions not fully realized.

In order to utilize the entire effect of a light source, it was tried to copy a plurality of films simultaneously. This was accomplished by a feeding apparatus in which a number of films were guided past the light source and transversal thereto. The efficiency of the light source was thereby increased to a notable extent; however a certain amount of the efficiency was lost on account of the fact that spaces between the various films had to be provided.

Another attempt to utilize the lamp as light source to a fuller extent consists in conducting one film longitudinally past the light source. The difficulties which occurred with this arrangement consisted in non-uniform distribution of light upon the film, and in difficulties to register the sensitized film and the negative for the entire length of the light source. In order to explain this point a little further, attention is called to the ordinary shape of a mercury vapor light source, which usually has the form of an elongated tube. The discharge is effected within the gas filled atmosphere of this tube, and the path of the discharge is approximately in the center of the tube and longitudinal thereto. Now, when the film was conducted longitudinally past the tube the center of the film received more light than the edges; in other words, the film was not uniformly exposed to the light. The difficulties in registering the film and negative in the last described arrangement are due to mechanical imperfections manifesting themselves under the high temperatures occurring in close proximity to the lamp.

The copying methods described above were limited to utilizing merely the intensity naturally rendered by the lamp, and it is quite reasonable to assume that the difficulties experienced were due to this limiting factor. Thorough investigations have shown that the actinic rays emanating from the discharge path within the gaseous atmosphere of the lamp are partially absorbed by the gaseous atmosphere. The brightly lighting central discharge path is surrounded by a gaseous atmosphere less lighting, which consists cheifly of mercury vapors. It is a well established fact, that a medium capable of emitting rays of a certain wave length also possesses the quality for strongly absorbing these rays. This accounts for the phenomenon for the absorption noticed above.

The principal object of the present invention is to eliminate the difficulties mentioned in the foregoing paragraphs and to increase the efficiency of the lamp and the entire copying procedure.

Another object is to avoid the detrimental absorption of actinic rays within the gaseous atmosphere of the lamp.

A further object is to increase the efficiency of the lamp by interposing between the discharge tube and the film a resonance lamp filled with mercury vapors, which responds to the action of the discharge tube, furnishing efficient emittance of active rays.

Another object of the invention is to reduce the time of exposure of the film or plate, thereby accelerating the copying process and rendering it more economical than was formerly possible.

The foregoing object and others are being attained by the method which is the subject matter of this specification, and which will be better understood from a detailed explanation.

According to the invention one or more magnetic or electromagnetic bodies are arranged near the discharge tube, in order to deflect the path of discharge towards the wall of the tube and directed to the copying area. The effect of deflecting the path of discharge consists in reduction of the sphere of absorption within the tube. In other words the gaseous atmosphere is reduced at the copying area and the detrimental influence of the mercury vapors is thereby eliminated.

Stationary as well as rotating magnetic fields may be employed for deflecting the path of discharge. It will be readily seen that there are numerous possibilities for arranging the magnetic bodies in relation to the tube. For example, two magnets may be placed opposite each other in an axis transversal to the tube and at right angles to the copying area. Another arrangement of the magnetic bodies may be indicated in case it is desired to expose a plurality of films simultaneously. It may be desirable in this case to use at least as many electromagnetic coils as there are copying areas, and to place these coils at right angles to these copying areas. Precaution has, however, to be taken with regard to the magnetic interference between the coils of the various fields.

Many other possibilities of arranging the coils will present themselves to anyone familiar with this subject.

Suitable cooling provisions may be arranged in order to prevent a raise of temperature detrimental to the film. Many cooling arrangements are known; the selection of the proper arrangement will entirely depend on local conditions.

The interposing of a resonance lamp, as mentioned previously, will also depend on local conditions and may be carried out with or without the use of magnetic means for deflecting the path of discharge in the discharge tube. Such a resonance lamp consists of an evacuated tube or chamber into which a drop of mercury was inserted prior to its evacuation. The evacuated chamber is therefore saturated with mercury vapors. This mercury vapor may be excited by light rays of the same wave length which the vapor itself may emit. Therefore it will be excited by the action of the mercury discharge tube and will serve as a strong source of light for copying. A quality of this resonance lamp is to emit uniform light over a relatively large area. Therefore, the interposing of such a resonance lamp between the discharge tube and the copying area serves to eliminate the non-uniform emittance of light mentioned previously. It may be said at this point that the shape of the resonance lamp might present a plane face to the copying area. This face of the resonance lamp may even serve as a guiding plane for the film or plate.

The invention will now be described with reference to the accompanying two sheets of drawings which form a part of this specification.

Fig. 1 of the drawings shows diagrammatically a copying unit in which the path of discharge is deflected towards the resonance lamp, which is interposed between the discharge tube and the copying area.

Figure 2:
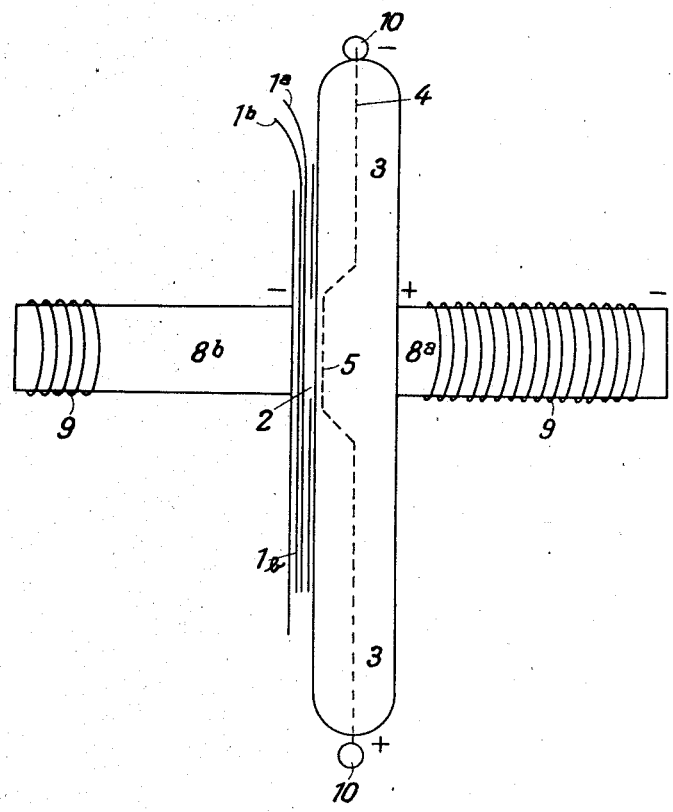

Fig. 2 illustrates a modification of the invention in which two electromagnetic bodies are employed for deflecting the path of discharge in the direction of the copying area.

In the drawings, the electromagnetic means are shown at right angles to their true position for the sake of clarity.

The detailed description will now be proceeded with:

Referring to the drawings Fig. 1, reference number 17 indicates a frame or support which carries a discharge tube 3, attached to the frame in any suitable manner. The terminals for the discharge tube are designated by numerals 10. Attached to the same frame are the electromagnet 8, having winding 9 and conductors 22 and 23; the resonance lamp 15; the guide 21 for receiving and guiding the film and negative 1 past the copying opening 2; and the toothed rack 20. A stationary gear 19 is provided for moving the entire apparatus attached to the frame, relative to the film and negative 1. Film and negative 1 are wound upon drum 11.

For the purpose of exposure, they are guided past the copying opening 2 and are then wound on drum 12. Therefore, it may be said, that both drums, 11 and 12, rotate clockwise in steps, during the copying operation.

The adjustment of the apparatus and means attached to frame 17 relative to the film and negative, which is effected by gear 19 and rack 20, is necessary for registering the window 2 and lamp 3, with respect to the film and negative so as to ensure at all times that the exposure of a complete picture is accomplished within the copying area. Reference numeral 7 indicates the normal path of discharge which would occur under ordinary circumstances; while number 6 indicates the deflected path of discharge, which occurs under the influence of magnet 8. Provisions for cooling the discharge tube are shown at 18.

The resonance lamp 15 is held in position by means of springs 16. This lamp may be of rectangular shape and its faces parallel to the copying openings may be of a material, permeable to actinic rays, such as quartz for example, while its other faces may be of any other suitable material, such as glass. The face of the resonance lamp which is adjacent the copying opening, may, as has been mentioned, serve as a guiding plane for the film and the negative.

A suitable device, indicated by numerals 13 and 14, is provided for guiding the film and the negative past the copying opening close to the face of the resonance lamp 15.

It will be understood, of course, that the inventive idea has merely received a graphic representation in the drawings described above. Details and modifications of various kind will readily suggest themselves to any one experienced in the art. I, therefore, do not wish to be limited to the exact manner of realizing the invention, as shown in Fig. 1, but desire to be limited solely by the prior art and by the claims, which are yet to follow.

The operation of the invention shown in Fig. 1 will now be briefly described.

The film and negative 1 are, during the action of the apparatus, advanced step by step past the copying opening, so that one picture after the other is exposed to the actinic rays emitted by the resonance lamp 15 under the action of the discharge tube 3. This discharge tube, at its terminals 10 is connected to an electric current in order to produce discharge through the lamp, which is indicated by 7. When electromagnet 8 is energized, the path of discharge through the discharge tube is deflected, as indicated at 6. It will be apparent, that this deflection of the discharge path will cause a decrease of the distance between the ray emitting section and the wall of the discharge tube. Since the discharge tube is filled with mercury vapor, the decrease of this distance will effect a corresponding decrease of the gaseous atmosphere, and will therefore result in an increase of the light intensity of the discharge tube. The radiation of rays effected by the discharge tube will cause excitation of the resonance lamp, and the latter in turn, will emit chemically active rays in uniform distribution over the entire area of the copying space.

A modification of the apparatus may be intimated at this place with reference to the drawings Fig. 1. The use of the resonance lamp as described above may be optional; depending on certain conditions it might be preferable to omit the resonance lamp and to use the discharge tube directly for copying purposes.

Referring now to the drawings Fig. 2 the modification shown therein, will be described only briefly, since it is believed, that the description furnished in connection with the arrangement shown in Fig. 1 is sufficient to enable ready understanding of Fig. 2, without elaborate reference to details.

Number 3 again indicates a discharge tube having terminals 10. Two electromagnets 8a and 8b are provided opposite each other and perpendicular to the discharge tube. Adjacent the discharge tube and displaced 90° from the electromagnet 8b is the copying opening 2. The film 1b and the negative 1a are guided in register to each other past the opening 2, in a manner similar to the one shown in Fig. 1. The magnets 8a and 8b are provided with coils 9 and when the same are energized the path of discharge 4 will be deflected towards the copying opening as indicated at 5. There are no provisions shown for cooling the discharge tube; for receiving the various apparatus; and for adjusting the copying opening with relation to the moving film and negative. It is, of course understood, that such provisions are necessary and present and that they have been omitted merely for the sake of clarity.

Having shown and described the invention in its aspects and details, what is claimed is particularly pointed out in the following claims.

I claim:

1. A device for copying photographic films, comprising a body having an opening for exposing the film, means for moving the negative and the copying film past said opening, a source of light comprising an electric discharge tube wherein discharges are effected through a gaseous atmosphere, and magnetic means for producing a constant deflection of the discharges through said tube towards said opening whereby to maintain a uniform distribution and constant intensity of the light.

2. A device for copying photographic films, comprising a body having an opening for exposure of the films, means for moving the negative and the copying film past said opening, an electric discharge tube wherein discharges are effected through a gaseous atmosphere, an evacuated resonance tube containing mercury vapor interposed between said opening and said discharge tube, and magnetic means for producing a constant deflection of the discharges through said discharge tube towards said resonance tube.

3. The combination with photographic copying apparatus, of a light source comprising an electric discharge tube wherein discharges are effected through a gaseous atmosphere, and means for producing a constant deflection of the discharges within said tube to one side thereof adjacent to the copying area whereby to produce a constant high intensity of the light.

4. The combination with photographic copying apparatus, of a light source comprising an electric discharge tube wherein discharges are effected through a gaseous atmosphere, and magnetic means for producing a constant deflection of the discharges within said tube to one side thereof adjacent to the copying area, whereby to produce a constant high intensity of the light.

5. The combination with photographic copying apparatus, of a light source comprising an electric discharge tube wherein discharges are effected through a gaseous atmosphere, and electromagnetic means for producing a constant deflection of the discharges within said tube to one side thereof adjacent to the copying area whereby to produce a constant high intensity of the light.

6. The combination with photographic copying apparatus, of a light source comprising an electric discharge tube wherein discharges are effected through a gaseous atmosphere, the path of the discharges being longitudinal to said tube and generally through the center thereof, and means for producing a constant deflection of said discharges towards one of the walls of said tube adjacent to the copying area whereby to produce a constant high intensity of the light.

7. The combination with photographic copying apparatus, of a light source comprising an electric discharge tube wherein discharges are effected through a gaseous atmosphere, the path of discharges being longitudinal to said tube and generally through the center thereof, and electromagnetic means for producing a constant deflection of said discharges towards one of the walls of said tube adjacent to the copying area whereby to produce a constant high intensity of the light.

8. The combination with photographic copying apparatus, of a light source comprising an electric discharge tube wherein discharges are effected through a gaseous atmosphere, the path of the discharges being longitudinal to said tube and generally through the center thereof, and means for producing a constant deflection of a portion of said discharges towards one of the walls of said tube whereby to produce a constant high intensity of the light, said deflected portion being opposite the copying area.

9. The combination with photographic copying apparatus, of a light source comprising an electric discharge tube wherein discharges are effected through a gaseous atmosphere, and means for producing a constant deflection of the discharges within said tube whereby to reduce the gaseous layer between the discharge path and the copying area and to increase the intensity of the light.

10. The combination with photographic copying apparatus, of a light source comprising an electric discharge tube wherein discharges are effected through a gaseous atmosphere, the path of the discharges being longitudinal to said tube and generally through the center thereof, and means for producing a constant deflection of a portion of said discharges towards one of the walls of said tube, said portion being opposite the copying area whereby to reduce the gaseous layer between the discharge path and the copying area and to increase the intensity of the light.

11. The combination with photographic copying apparatus, of a light source comprising an electric discharge tube wherein discharges are effected through a gaseous atmosphere, means for producing a constant deflection of the discharges within said tube whereby to maintain a uniform distribution and constant intensity of the light, and means adjacent to the copying area for cooling said tube.

12. The combination with photographic copying apparatus, of a light source comprising an evacuated resonance tube positioned adjacent to the copying area and adapted to contain mercury vapor, and an electric discharge tube wherein discharges are effected through a gaseous atmosphere for exciting the mercury vapor of said resonance tube.

13. The combination with photographic copying apparatus, of a light source comprising an evacuated resonance tube positioned adjacent to the copying area and adapted to contain mercury vapor, an electric discharge tube wherein discharges are effected through a gaseous atmosphere for exciting the mercury vapor within said resonance tube, and means for producing a constant deflection of the discharges within said electric discharge tube whereby to maintain a uniform distribution and constant intensity of the light.

14. The combination with photographic copying apparatus, of a light source comprising an evacuated resonance tube adapted to contain mercury vapor, an electric discharge tube wherein discharges are effected through a gaseous atmosphere for exciting the mercury vapor within said resonance tube, the path of discharge through said electric discharge tube being substantially through the center of said tube, and means for producing a constant deflection of the discharges therethrough to one side thereof opposite the copying area whereby to maintain a uniform distribution and constant intensity of the light.

In testimony whereof I hereunto affix my signature.

CARL ROEHRICH.